（12） United States Patent
Sakata et al.

(10) Patent No.: US 9,518,846 B2
(45) Date of Patent: Dec. 13, 2016

(54) REFLECTIVE OPTICAL ENCODER HAVING RESIN-MADE CODE PLATE

(71) Applicant: FANUC CORPORATION, Minamitsuru-gun, Yamanashi (JP)

(72) Inventors: Akinobu Sakata, Yamanashi (JP); Nobuyuki Ootake, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 32 days.

(21) Appl. No.: 14/590,400

(22) Filed: Jan. 6, 2015

(65) Prior Publication Data

US 2015/0211898 A1    Jul. 30, 2015

(30) Foreign Application Priority Data

Jan. 24, 2014   (JP) ................................ 2014-011629

(51) Int. Cl.
*G01D 5/347*    (2006.01)

(52) U.S. Cl.
CPC ...... *G01D 5/34715* (2013.01); *G01D 5/34707* (2013.01)

(58) Field of Classification Search
CPC ............ G01D 5/24715; G01D 5/34707; G01D 5/3473
See application file for complete search history.

(56) References Cited

U.S. PATENT DOCUMENTS

| 3,598,493 | A | * | 8/1971 | Fisher | ................... | G01D 5/347 250/231.16 |
|---|---|---|---|---|---|---|
| 4,536,650 | A | * | 8/1985 | Carena | ................... | G01D 5/347 250/231.14 |
| 4,815,850 | A | * | 3/1989 | Kanayama | ............ | G03F 9/7049 356/488 |
| 4,820,918 | A | * | 4/1989 | Igaki | ..................... | G01D 5/347 250/231.13 |
| 5,500,734 | A | * | 3/1996 | Spanner | .................. | G01D 5/38 250/237 G |
| 6,222,183 | B1 | * | 4/2001 | Taniguchi | .............. | G01D 5/347 250/231.13 |

(Continued)

FOREIGN PATENT DOCUMENTS

JP    08233608    9/1996
JP    09329464    12/1997

(Continued)

*Primary Examiner* — John Lee
(74) *Attorney, Agent, or Firm* — RatnerPrestia (57) ABSTRACT

A reflective optical encoder, which is inexpensive and is compact in the axial direction thereof. An encoder has a generally circular code plate fixed to a rotating body such as a rotation shaft of a motor; and a light emitting unit and a light receiving unit which are positioned near a first major surface of the code plate. The code plate is made from a light transmissive resin, and on the first major surface, an incidence portion with a concavo-convex shape and an emission portion with a concavo-convex shape are formed. On a second major surface opposed to the first major surface, a transmission portion formed from a concavo-convex shape and configured to transmit light, and a total reflection portion formed from a flat surface and configured to totally reflect light, are formed, wherein the transmission portion and the total reflection portion constitute a code pattern section.

6 Claims, 12 Drawing Sheets

(56) References Cited

U.S. PATENT DOCUMENTS

| | | | | |
|---|---|---|---|---|
| 6,246,482 B1* | 6/2001 | Kinrot | ...................... | G01D 5/26 356/499 |
| 6,526,190 B2* | 2/2003 | Holzapfel | .......... | G01D 5/34715 250/231.16 |
| 6,803,560 B1* | 10/2004 | Okumura | ................. | G01D 5/38 250/231.13 |
| 6,927,388 B2* | 8/2005 | Imai | ................... | G01D 5/34707 250/231.13 |
| 6,975,408 B2* | 12/2005 | Igaki | ........................ | G01D 5/36 250/231.13 |
| 7,022,974 B2* | 4/2006 | Igaki | ........................ | G01D 5/38 250/231.13 |
| 7,045,770 B2* | 5/2006 | Igaki | ........................ | G01D 5/38 250/231.13 |
| 7,145,127 B2* | 12/2006 | Chin | ................... | G01D 5/34707 250/216 |
| 7,285,769 B2* | 10/2007 | Oka | ........................ | G01D 5/36 250/231.13 |
| 2002/0122186 A1* | 9/2002 | Igaki | ........................ | G01D 5/36 356/616 |
| 2003/0218125 A1* | 11/2003 | Igaki | ........................ | G01D 5/38 250/231.13 |
| 2006/0028653 A1* | 2/2006 | Igaki | ........................ | G01D 5/38 356/499 |
| 2006/0043271 A1* | 3/2006 | Chin | ................... | G01D 5/34707 250/231.13 |
| 2007/0034786 A1* | 2/2007 | Oka | ........................ | G01D 5/36 250/231.13 |
| 2007/0114283 A1* | 5/2007 | Foo | ..................... | G01D 5/34715 235/454 |
| 2008/0099668 A1* | 5/2008 | Hwang | ............... | G01D 5/35377 250/227.31 |
| 2008/0316492 A1* | 12/2008 | Cheng | ................ | G01D 5/34723 356/445 |
| 2009/0108188 A1* | 4/2009 | Urabe | ................ | G01D 5/34723 250/231.1 |
| 2010/0252722 A1 | 10/2010 | Procsal | | |
| 2013/0320201 A1* | 12/2013 | Noguchi | ........... | G01D 5/34784 250/231.18 |
| 2014/0349083 A1* | 11/2014 | Kakinuma | ......... | G01D 5/34707 428/182 |
| 2015/0211898 A1* | 7/2015 | Sakata | ............... | G01D 5/34715 250/231.1 |
| 2015/0323351 A1* | 11/2015 | Sakata | ................. | G01D 5/3473 250/231.13 |
| 2015/0354993 A1* | 12/2015 | Sakata | ............... | G01D 5/34715 250/231.18 |

FOREIGN PATENT DOCUMENTS

| | | |
|---|---|---|
| JP | 11-287671 | 11/1999 |
| JP | 2000121388 | 4/2000 |
| JP | 2004258466 | 9/2004 |
| JP | 2004-325231 | 11/2004 |
| JP | 2005016998 | 1/2005 |
| JP | 2006030006 | 2/2006 |
| JP | 2006250877 | 9/2006 |
| JP | 2011179938 | 9/2011 |
| JP | 2012237616 | 12/2012 |

* cited by examiner

REFLECTIVE OPTICAL ENCODER HAVING RESIN-MADE CODE PLATE

BACKGROUND OF THE INVENTION

1. Field of the Invention

The present invention relates to a reflective optical encoder having a resin-made code plate.

2. Description of the Related Art

An optical encoder is connected to a rotation axis, etc., of a motor, and is used to detect the rotational position and velocity of the rotation axis. As an example of such an encoder, JP 2004-325231 A discloses an optical encoder having a light emitting unit positioned near one side of a resin-made code plate and a light receiving unit positioned near the other side of the code plate, wherein light from the light emitting unit passes through the code plate and is received by the light receiving unit.

In the encoder as disclosed in JP 2004-325231 A, the light emitting unit and the light receiving unit are positioned near the opposed sides of the code plate. Therefore, an axial dimension of the encoder is relatively large. In this regard, for example, JP H11-287671 A (FIGS. 12 to 15) discloses an optical encoder having a light emitting unit and a light receiving unit positioned near the same side of a code plate, wherein light from the light emitting unit is reflected by the code plate and is received by the light receiving unit.

As in the encoder as disclosed in JP 2004-325231 A, when the light emitting unit and the light receiving unit are positioned near the opposed sides of the code plate, the axial dimension of the encoder is relatively large.

SUMMARY OF THE INVENTION

Thus, the object of the present invention is to provide a reflective optical encoder which is inexpensive and is compact in the axial direction thereof.

The present invention provides a reflective optical encoder comprising: a code plate which is formed by resin material and has a first major surface and a second major surface opposed to the first major surface; a light emitting unit positioned near the first major surface of the code plate; and a light receiving unit positioned near the first major surface of the code plate, wherein the first major surface of the code plate has an incidence portion with a concavo-convex shape and an emission portion with a concavo-convex shape, and wherein the second major surface of the code plate has a code pattern section including a transmission portion formed from a V-shape, a triangular shape or a curved surface and configured to transmit light, and a total reflection portion formed from a flat surface and configured to totally reflect light.

In a preferred embodiment, the concavo-convex shape of the incidence portion is a V-shape or a triangular shape.

In another preferred embodiment, the concavo-convex shape of the incidence portion is a curved shape.

In a preferred embodiment, the concavo-convex shape of the emission portion is a V-shape or a triangular shape.

In another preferred embodiment, the concavo-convex shape of the emission portion is a curved shape.

BRIEF DESCRIPTION OF THE DRAWINGS

The above and other objects, features and advantages of the present invention will be made more apparent by the following description of the preferred embodiments thereof, with reference to the accompanying drawings, wherein.

DETAILED DESCRIPTION

Figure 1A:
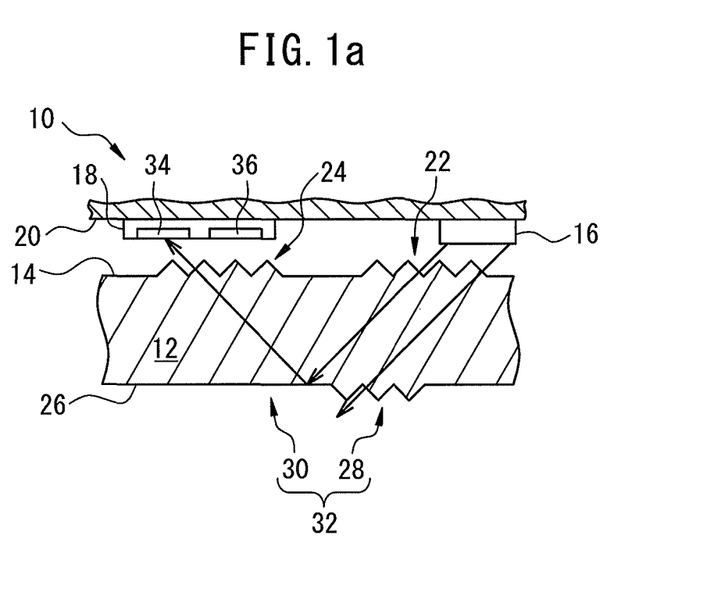
FIG. 1a is a basic configuration of a major part of a reflective optical encoder according to the present invention.
Figure 1B:
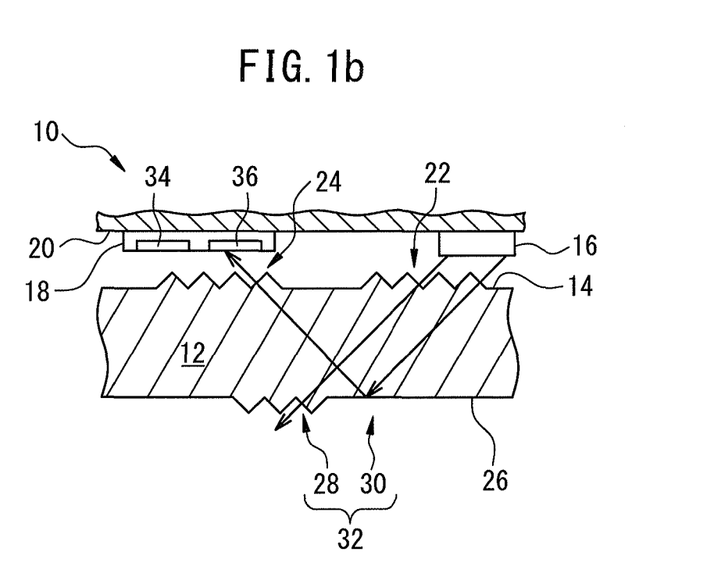
FIG. 1b is the basic configuration of the major part of the reflective optical encoder according to the present invention.

FIGS. 1a and 1b are cross-sectional views showing a schematic basis configuration of a major part of a reflective optical encoder 10 according to an embodiment of the invention. Encoder 10 has a generally circular code plate 12 fixed to a rotating body (not shown) such as a rotation shaft of a motor, a light emitting unit 16 positioned near (in proximity to) a first major surface 14 of code plate 12, and a light receiving unit 18 positioned near (in proximity to) first major surface 14 of code plate 12 (i.e., positioned near the same surface as light emitting unit 16). As shown, light emitting unit 16 and light receiving unit 18 may be located on a printed board 20 which is separated from first major surface 14 so as to face first major surface 14.

Code plate 12 is made from a light transmissive resin, and on first major surface 14, an incidence portion 22 with a concavo-convex shape and an emission portion 24 with a concavo-convex shape are formed, wherein light from light emitting unit 16 enters incident portion 22, and light toward light receiving unit 18 emits from emission portion 24. On a second major surface 26 opposed to first major surface 14 of code plate 12, a transmission portion 28 formed from a concavo-convex shape (i.e., a V-shape, a triangular shape or a curved surface) and configured to transmit light, and a total reflection portion 30 formed from a flat surface and configured to totally reflect light, are formed, wherein transmission portion 28 and total reflection portion 30 constitute a code pattern section 32. In other words, in encoder 10, light from light emitting unit 16 enters incidence portion 22 and travels within code plate 12, and then, a part of the light leaves transmission portion 28, while the remaining part of the light is totally reflected by total reflection portion 30, travels within code plate 12 again, and leaves emission portion 24, and reaches light receiving unit 18.

Light receiving unit 18 has an A-phase part 34 and a B-phase part 36. In a state of FIG. 1a, light is reflected by total reflection portion 30, leaves emission portion 24, and then is received by A-phase part 34. In other words, in the state of FIG. 1a, A-phase part 34 is "bright" and B-phase part 36 is "dark." On the other hand, in a state of FIG. 1b, light is reflected by total reflection portion 30, leaves emission portion 24, and then is received by B-phase part 36. In other words, in the state of FIG. 1b, A-phase part 34 is "dark" and B-phase part 36 is "bright." As such, when code plate 12 is rotated, "bright" and "dark" are alternately changed between A-phase part 34 and B-phase part 36, whereby a pulse signal waveform is obtained. By virtue of this, the rotational angular position and the rotational velocity of the rotating body, to which code plate 12 is fixed, can be measured. Since such a basic function of the encoder may be common to embodiments as described below, only the state wherein A-phase part 34 is "bright" will be explained in the following embodiments.

In encoder 10 of the invention, each of incidence portion 22 and emission portion 24 has a concavo-convex shape which transmits or refracts light. By providing the concavo-convex shape to incidence portion 22 and emission portion 24, an angle of light toward total reflection portion 30 after entering incidence portion 22 from light emitting unit 16, and an angle of light toward light receiving unit 18 after being totally reflected by total reflection portion 30 and leaving emission portion can be appropriately adjusted. In addition, as an inexpensive and compact device, wherein the light emitting unit and the light receiving unit are previously packaged, may be used for the encoder.

As a concrete example for the concavo-convex shape of incidence portion 22, emission portion 24 and transmission portion 28, a V-shape, a triangular shape and a curved surface may be used. Hereinafter, embodiments thereof will be explained.

Figure 2A:
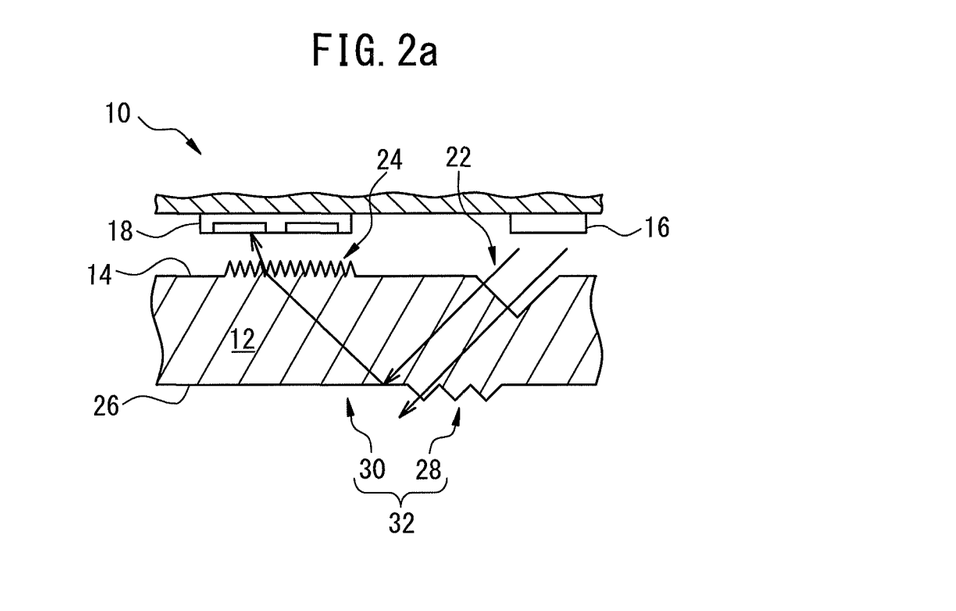
FIG. 2a shows an example wherein an incidence portion is formed from one V-shape, an emission portion is formed from a plurality of triangular shapes, and a light emitting unit is a directional light source.
Figure 2B:
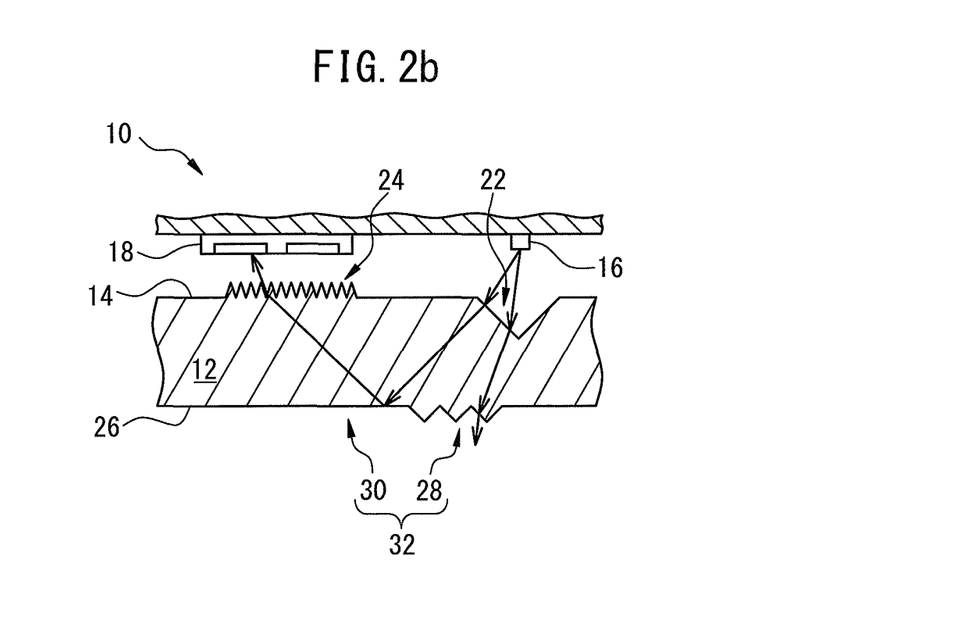
FIG. 2b shows an example wherein an incidence portion is formed from one V-shape, an emission portion is formed from a plurality of triangular shapes, and a light emitting unit is a point light source.
Figure 2C:
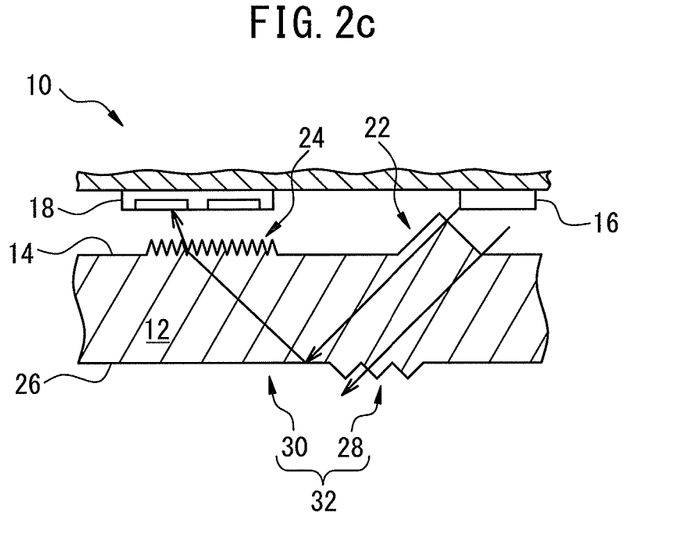
FIG. 2c shows an example wherein an incidence portion is formed from one triangle shape, an emission portion is formed from a plurality of triangular shapes, and a light emitting unit is a directional light source.
Figure 2D:
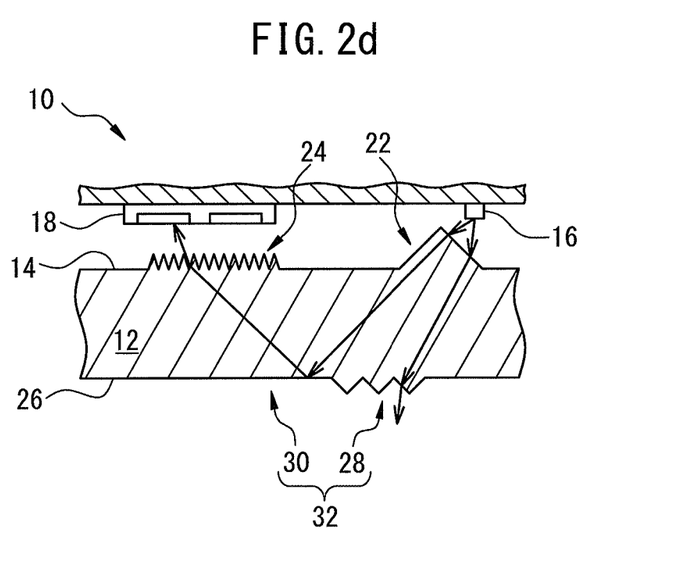
FIG. 2d shows an example wherein an incidence portion is formed from one triangle shape, an emission portion is formed from a plurality of triangular shapes, and a light emitting unit is a point light source.

FIGS. 2a and 2b show examples wherein incidence portion 22 is formed from one V-shape (V-groove), and emission portion 24 is formed from a plurality of triangular shapes. On the other hand, FIGS. 2c and 2d shows examples wherein incidence portion 22 is formed from one triangular shape (prism), and emission portion 24 is formed from a plurality of triangular shapes. Further, FIGS. 2a and 2c shows that light emitting unit 16 is a directional light source which emits parallel light, and FIGS. 2b and 2d shows that light emitting unit 16 is a point light source which emits radial light. Herein, a structure, which dents from first major surface 14 or second major surface 26 and has a V-shape in an axial cross-section, is referred to as a "V-shape," and a structure, which protrudes from first major surface 14 or second major surface 26 and has a triangular shape in the axial cross-section, is referred to as a "triangular shape."

In the examples of FIGS. 2a and 2c, parallel light from light emitting unit 16 is directed to transmission portion 28 and total reflection portion 30, without being deflected by incidence portion 22 (i.e., the parallel light vertically enters an inclined surface constituting incidence portion 22). Then, light, which is reflected by total reflection portion 30, is deflected by emission portion 24 toward light emitting unit 16, and is received by light receiving unit 18. On the other hand, in the examples of FIGS. 2b and 2d, radial light from light emitting unit 16 is directed to transmission portion 28 and total reflection portion 30, while at least a part of the light is deflected by incidence portion 22. Then, light, which is reflected by total reflection portion 30, is deflected by emission portion 24 toward light emitting unit 16, and is received by light receiving unit 18.

In other words, in any of the examples of FIGS. 2a to 2d, a concavo-convex shape having the V-shape or the triangular shape is formed on incidence portion 22 so that light from light emitting unit 16 is deflected by incidence portion 22 or transmits through incidence portion 22 without being deflected, and then reaches total reflection portion 30 at an appropriate angle so as to be totally reflected. By virtue of this, an incident angle of light from incidence portion 22 to total reflection portion 30 is appropriately adjusted. When light emitting unit 16 emits either parallel light or radial light, the incident angle of light toward total reflection portion 30 can be appropriately adjusted by selecting the shape (for example, an angle of the inclined surface constituting the V-shape or the triangular shape) of incidence portion 22. Further, by providing a concavo-convex shape (or a triangular shape) to emission portion 24, an output angle of light from emission portion 24 to light receiving unit 18 is appropriately adjusted.

Figure 3A:
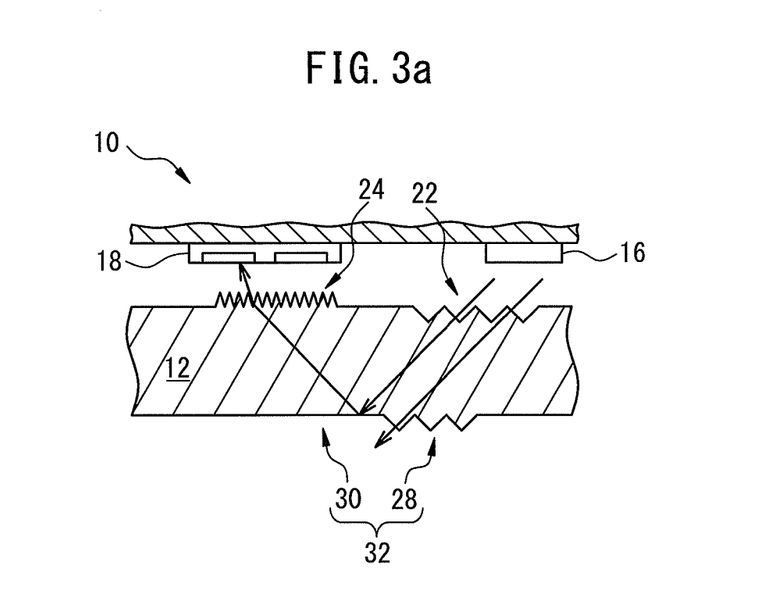
FIG. 3a shows an example wherein an incidence portion is formed from a plurality of V-shapes, an emission portion is formed from a plurality of triangular shapes, and a light emitting unit is a directional light source.
Figure 3B:
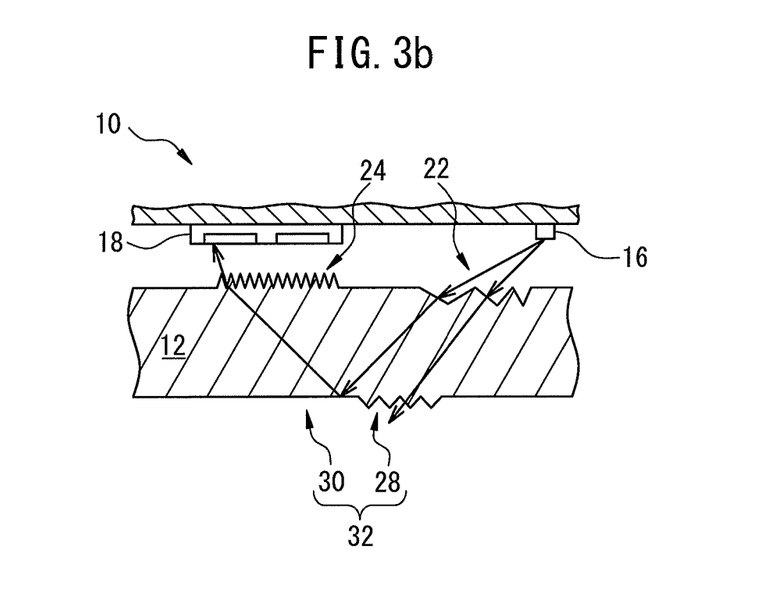
FIG. 3b shows an example wherein an incidence portion is formed from a plurality of V-shapes, an emission portion is formed from a plurality of triangular shapes, and a light emitting unit is a point light source.
Figure 3C:
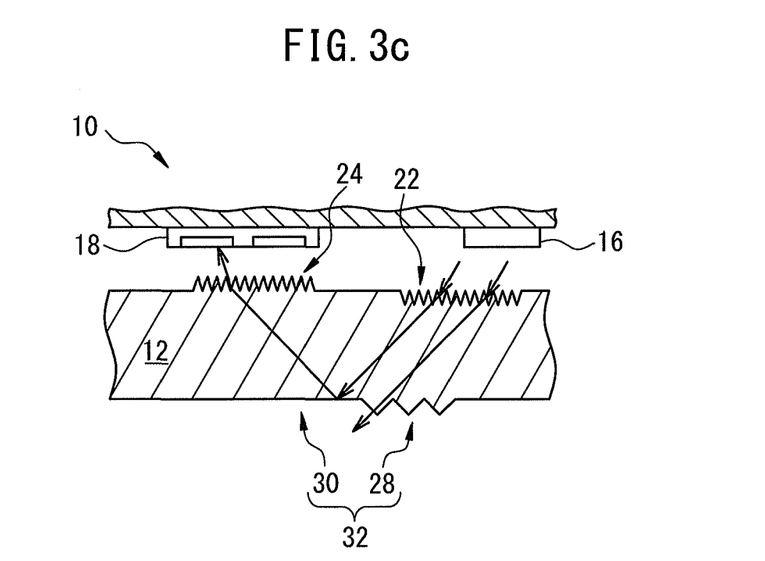
FIG. 3c shows an example wherein an incidence portion is formed from a plurality of V-shapes, an emission portion is formed from a plurality of triangular shapes, and a light emitting unit is a directional light source.

FIGS. 3a to 3c show examples wherein incidence portion 22 is formed from a plurality of V-shapes (V-grooves), and emission portion 24 is formed from a plurality of triangular shapes. Further, FIGS. 3a and 3c show that light emitting unit 16 is a directional light source, and FIG. 3b shows that light emitting unit 16 is a point light source.

In the example of FIG. 3a, similarly to the example of FIG. 2a, parallel light from light emitting unit 16 is directed to transmission portion 28 and total reflection portion 30, without being deflected by incidence portion 22 (i.e., the parallel light vertically enters an inclined surface constituting incidence portion 22). Then, light, which is reflected by total reflection portion 30, is deflected by emission portion 24 toward light emitting unit 16, and is received by light receiving unit 18. In the example of FIG. 3b, similarly to the example of FIG. 2b, radial light from light emitting unit 16 is directed to transmission portion 28 and total reflection portion 30, while at least a part of the light from light emitting unit 16 is deflected by incidence portion 22. Then, light, which is reflected by total reflection portion 30, is deflected by emission portion 24 toward light emitting unit 16, and is received by light receiving unit 18. Further, in the example of FIG. 3c, radial light from light emitting unit 16 is deflected by incidence portion 22 toward light receiving unit 18 and is directed to transmission portion 28 and total reflection portion 30. Then, light, which is reflected by total reflection portion 30, is deflected by emission portion 24 toward light emitting unit 16, and is received by light receiving unit 18.

In other words, in any of the examples of FIGS. 3a to 3c, a concavo-convex shape having the V-shape or the triangular shape is formed on incidence portion 22 so that light from light emitting unit 16 is deflected by incidence portion 22 or transmits through incidence portion 22 without being deflected, and then reaches total reflection portion 30 at an appropriate angle so as to be totally reflected. By virtue of this, an incident angle of light from incidence portion 22 to total reflection portion 30 is appropriately adjusted. When light emitting unit 16 emits either parallel light or radial light, the incident angle of light toward total reflection portion 30 can be appropriately adjusted by selecting the shape (for example, an angle of the inclined surface constituting the V-shape or the triangular shape) of incidence portion 22. Further, by providing a concavo-convex shape (or a triangular shape) to emission portion 24, an output angle of light from emission portion 24 to light receiving unit 18 is appropriately adjusted.

Figure 4A:
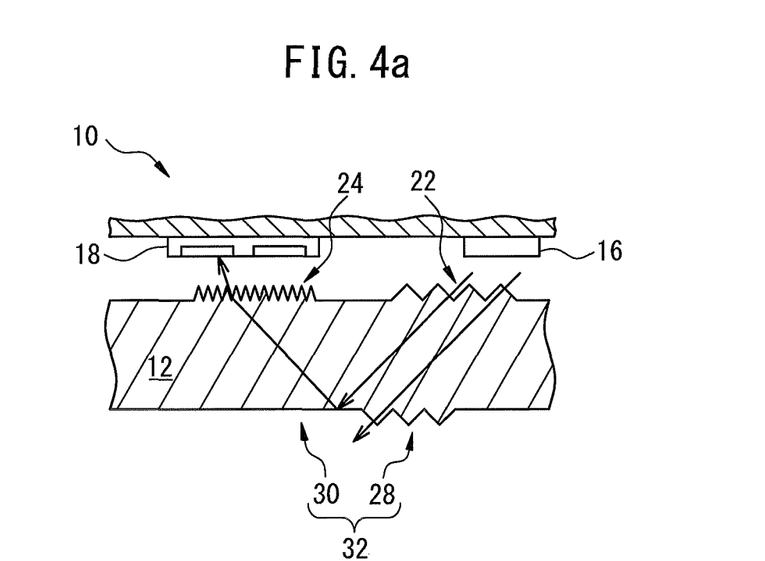
FIG. 4a shows an example wherein an incidence portion is formed from a plurality of triangular shapes, an emission portion is formed from a plurality of triangular shapes, and a light emitting unit is a directional light source.
Figure 4B:
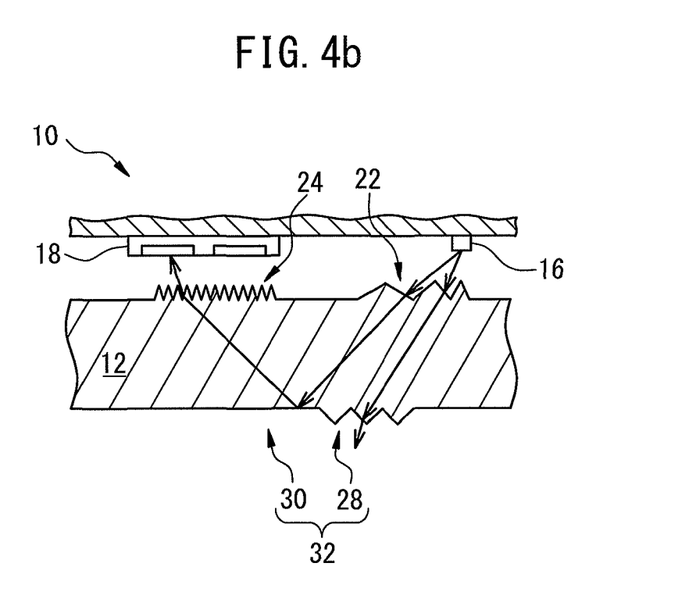
FIG. 4b shows an example wherein an incidence portion is formed from a plurality of triangular shapes, an emission portion is formed from a plurality of triangular shapes, and a light emitting unit is a point light source.
Figure 4C:
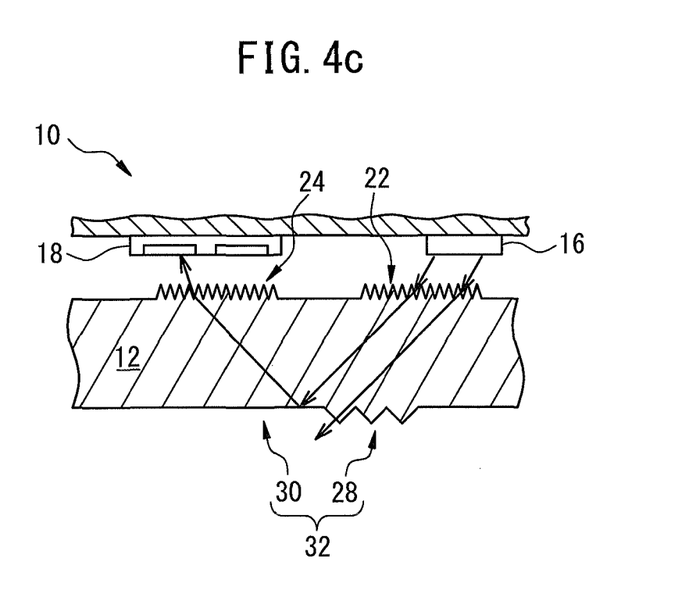
FIG. 4c shows an example wherein an incidence portion is formed from a plurality of triangular shapes, an emission portion is formed from a plurality of triangular shapes, and a light emitting unit is a directional light source.

FIGS. 4a to 4c show examples wherein incidence portion 22 is formed from a plurality of triangular shapes, and emission portion 24 is formed from a plurality of triangular shapes. Further, FIGS. 4a and 4c show that light emitting unit 16 is a directional light source, and FIG. 4b shows that light emitting unit 16 is a point light source.

In the example of FIG. 4a, similarly to the examples of FIGS. 2a and 3a, parallel light from light emitting unit 16 is directed to transmission portion 28 and total reflection portion 30, without being deflected by incidence portion 22. Then, light, which is reflected by total reflection portion 30, is deflected by emission portion 24, and is received by light receiving unit 18. In the example of FIG. 4b, similarly to the examples of FIGS. 2b and 3b, radial light from light emitting unit 16 is directed to transmission portion 28 and total reflection portion 30, while at least a part of the light from light emitting unit 16 is deflected by incidence portion 22. Then, light, which is reflected by total reflection portion 30, is deflected by emission portion 24 toward light emitting unit 16, and is received by light receiving unit 18. Further, in the example of FIG. 4c, radial light from light emitting unit 16 is deflected by incidence portion 22 toward light receiving unit 18 and is directed to transmission portion 28 and total reflection portion 30. Then, light, which is reflected by total reflection portion 30, is deflected by emission portion 24 toward light emitting unit 16, and is received by light receiving unit 18.

In other words, in any of the examples of FIGS. 4a to 4c, a concavo-convex shape having the V-shape or the triangular shape is formed on incidence portion 22 so that light from light emitting unit 16 is deflected by incidence portion 22 or transmits through incidence portion 22 without being deflected, and then reaches total reflection portion 30 at an appropriate angle so as to be totally reflected. By virtue of this, an incident angle of light from incidence portion 22 to total reflection portion 30 is appropriately adjusted. When light emitting unit 16 emits either parallel light or radial light, the incident angle of light toward total reflection portion 30 can be appropriately adjusted by selecting the shape (for example, an angle of the inclined surface constituting the V-shape or the triangular shape) of incidence portion 22. Further, by providing a concavo-convex shape (or a triangular shape) to emission portion 24, an output angle of light from emission portion 24 to light receiving unit 18 is appropriately adjusted.

Figure 5A:
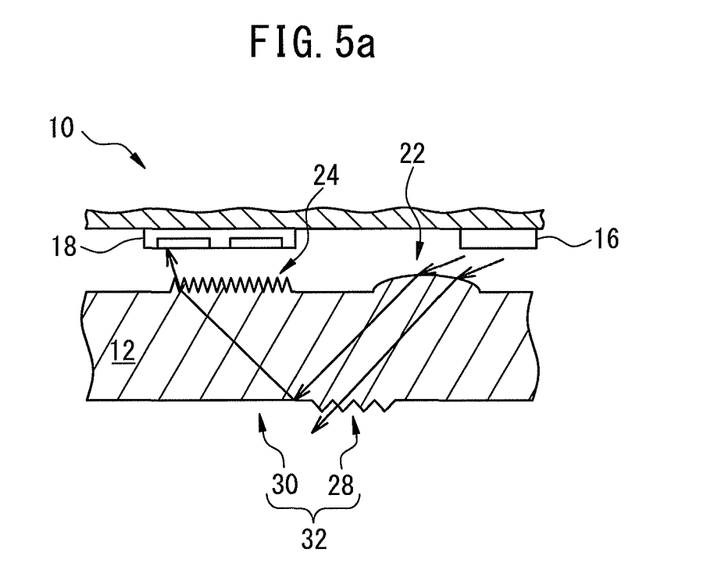
FIG. 5a shows an example wherein an incidence portion is formed from one curved surface, an emission portion is formed from a plurality of triangular shapes, and a light emitting unit is a directional light source.
Figure 5B:
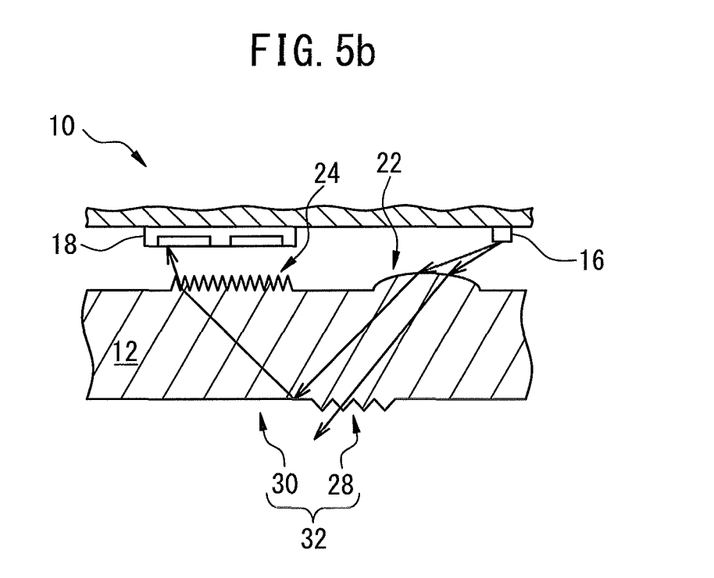
FIG. 5b shows an example wherein an incidence portion is formed from one curved surface, an emission portion is formed from a plurality of triangular shapes, and a light emitting unit is a point light source.

FIGS. 5a and 5b show examples wherein incidence portion 22 is formed from one curved surface (lens), and emission portion 24 is formed from a plurality of triangular shapes. Further, FIG. 5a shows that light emitting unit 16 is a directional light source, and FIG. 5b shows that light emitting unit 16 is a point light source.

In the examples of FIGS. 5a and 5b, similarly to the examples of FIGS. 3c and 4c, parallel light or radial light from light emitting unit 16 is deflected by incidence portion 22 and is directed to transmission portion 28 and total reflection portion 30. Then, light, which is reflected by total reflection portion 30, is deflected by emission portion 24, and is received by light receiving unit 18.

In other words, in any of the examples of FIGS. 5a and 5b, a concavo-convex shape having the V-shape, the triangular shape or the curved surface is formed on incidence portion 22 so that light from light emitting unit 16 is deflected by incidence portion 22, and then reaches total reflection portion 30 at an appropriate angle so as to be totally reflected. By virtue of this, an incident angle of light from incidence portion 22 to total reflection portion 30 is appropriately adjusted. When light emitting unit 16 emits either parallel light or radial light, the incident angle of light toward total reflection portion 30 can be appropriately adjusted by selecting the curved shape of incidence portion 22. Further, by providing a concavo-convex shape (or a triangular shape) to emission portion 24, an output angle of light from emission portion 24 to light receiving unit 18 is appropriately adjusted. As such, when one curved shape is used as the concavo-convex shape of incidence portion 22, the same function and effect may be obtained as is the case when the V-shape or triangular shape is used.

Figure 6A:
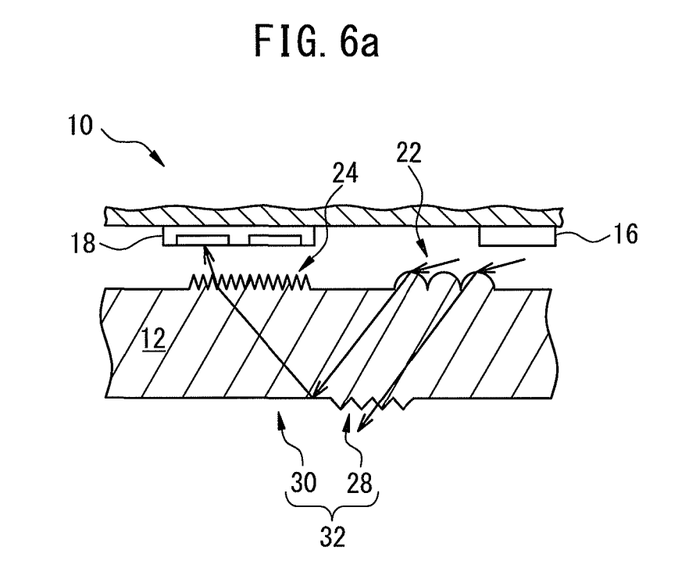
FIG. 6a shows an example wherein an incidence portion is formed from a plurality of curved surfaces, an emission portion is formed from a plurality of triangular shapes, and a light emitting unit is a directional light source.
Figure 6B:
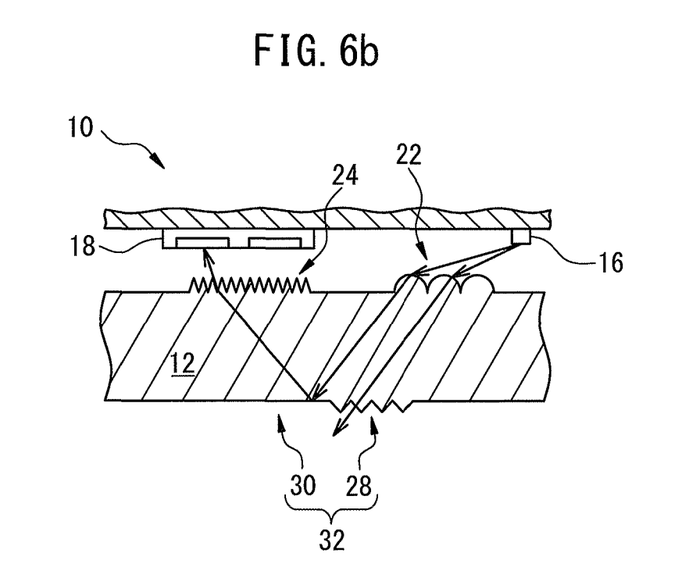
FIG. 6b shows an example wherein an incidence portion is formed from a plurality of curved surfaces, an emission portion is formed from a plurality of triangular shapes, and a light emitting unit is a point light source.

FIGS. 6a and 6b show examples wherein incidence portion 22 is formed from a plurality of curved surfaces (lens), and emission portion 24 is formed from a plurality of triangular shapes. Further, FIG. 6a shows that light emitting unit 16 is a directional light source, and FIG. 6b shows that light emitting unit 16 is a point light source.

In the examples of FIGS. 6a and 6b, similarly to the examples of FIGS. 5a and 5b, parallel light or radial light from light emitting unit 16 is deflected by incidence portion 22 and is directed to transmission portion 28 and total reflection portion 30. Then, light, which is reflected by total reflection portion 30, is deflected by emission portion 24, and is received by light receiving unit 18.

In other words, in any of the examples of FIGS. 6a and 6b, a concavo-convex shape having the V-shape, the triangular shape or the curved surface is formed on incidence portion 22 so that light from light emitting unit 16 is deflected by incidence portion 22, and then reaches total reflection portion 30 at an appropriate angle so as to be totally reflected. By virtue of this, an incident angle of light from incidence portion 22 to total reflection portion 30 is appropriately adjusted. When light emitting unit 16 emits either parallel light or radial light, the incident angle of light toward total reflection portion 30 can be appropriately adjusted by selecting the curved shape of incidence portion 22. Further, by providing a concavo-convex shape (or a triangular shape) to emission portion 24, an output angle of light from emission portion 24 to light receiving unit 18 is appropriately adjusted. As such, when a plurality of curved shapes are used as the concavo-convex shape of incidence portion 22, the same function and effect may be obtained as is the case when the V-shape or triangular shape is used.

Figure 7A:
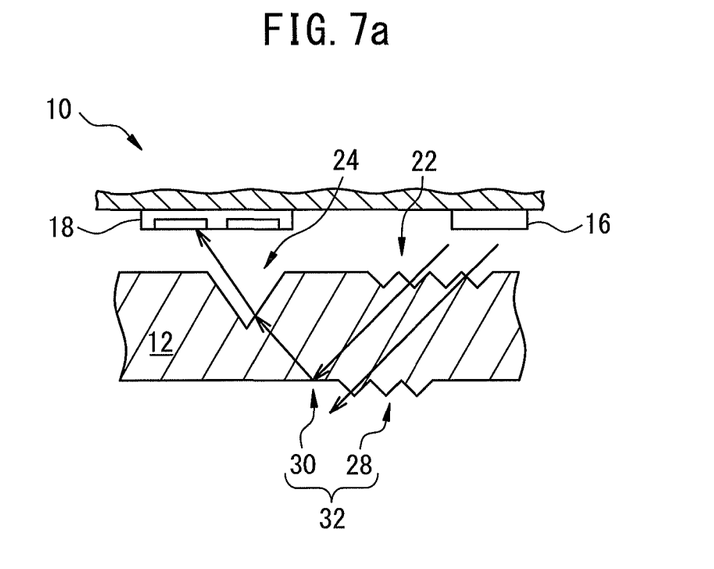
FIG. 7a shows an example wherein an incidence portion is formed from a plurality of V-shapes, an emission portion is formed from one V-shape, and a light emitting unit is a directional light source.
Figure 7B:
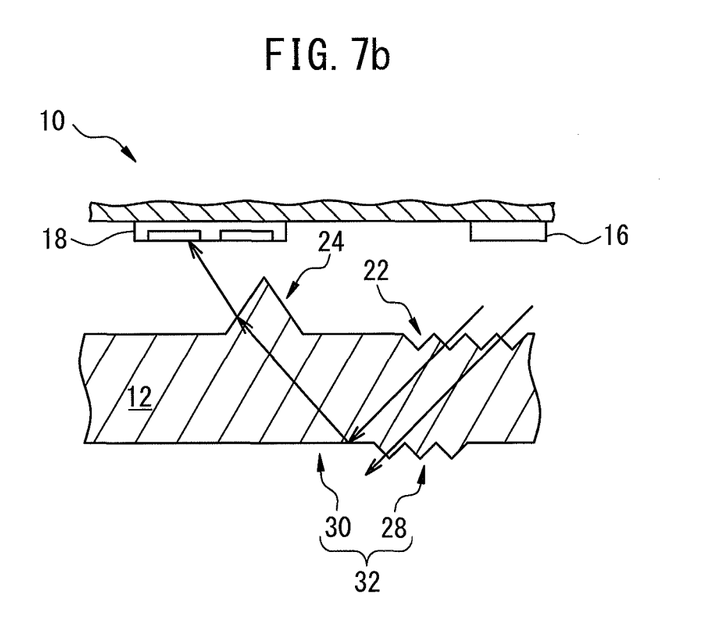
FIG. 7b shows an example wherein an incidence portion is formed from a plurality of V-shapes, an emission portion is formed from one triangular shape; and a light emitting unit is a directional light source.

FIG. 7a shows an example wherein incidence portion 22 is formed from a plurality of V-shapes, and emission portion 24 is formed from one V-shape. On the other hand, FIG. 7b shows an example wherein incidence portion 22 is formed from a plurality of V-shapes, and emission portion 24 is formed from one triangular shape. In the both examples, light emitting unit 16 is a directional light source.

In the examples of FIGS. 7a and 7b, similarly to the example of FIG. 3a, parallel light from light emitting unit 16 is directed to transmission portion 28 and total reflection portion 30, without being deflected by incidence portion 22. Then, light, which is reflected by total reflection portion 30, is deflected by emission portion 24, and is received by light receiving unit 18.

In other words, in any of the examples of FIGS. 7a and 7b, the output angle of light from total reflection portion 30 to light receiving unit 18 via emission portion 24 can be appropriately adjusted by selecting the shape (for example, an angle of the inclined surface constituting the V-shape or the triangular shape) of emission portion 24.

Figure 8A:
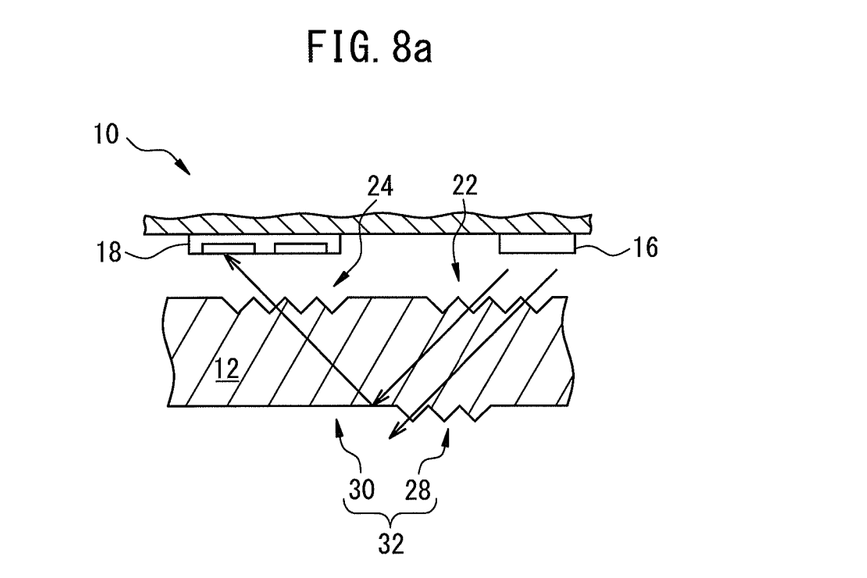
FIG. 8a shows an example wherein an incidence portion is formed from a plurality of V-shapes, an emission portion is formed from a plurality of V-shapes, and a light emitting unit is a directional light source.
Figure 8B:
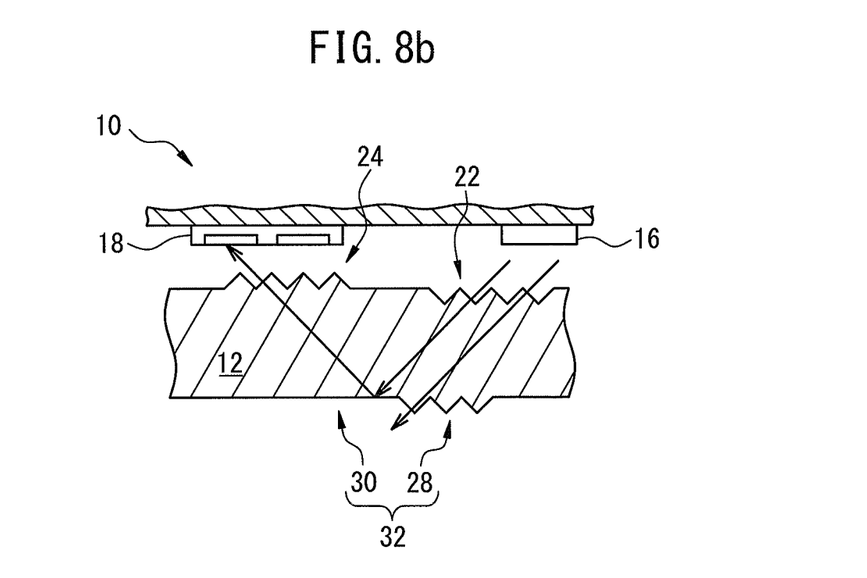
FIG. 8b shows an example wherein an incidence portion is formed from a plurality of V-shapes, an emission portion is formed from a plurality of triangular shapes, and a light emitting unit is a directional light source.

FIG. 8a shows an example wherein incidence portion 22 is formed from a plurality of V-shapes, and emission portion 24 is formed from a plurality of V-shapes. On the other hand, FIG. 8b shows an example wherein incidence portion 22 is formed from a plurality of V-shapes, and emission portion 24 is formed from a plurality of triangular shape. In the both examples, light emitting unit 16 is a directional light source.

In the examples of FIGS. 8a and 8b, parallel light from light emitting unit 16 is directed to transmission portion 28 and total reflection portion 30, without being deflected by incidence portion 22. Then, light, which is reflected by total reflection portion 30, is received by light receiving unit 18, without being deflected by emission portion 24.

Figure 9:
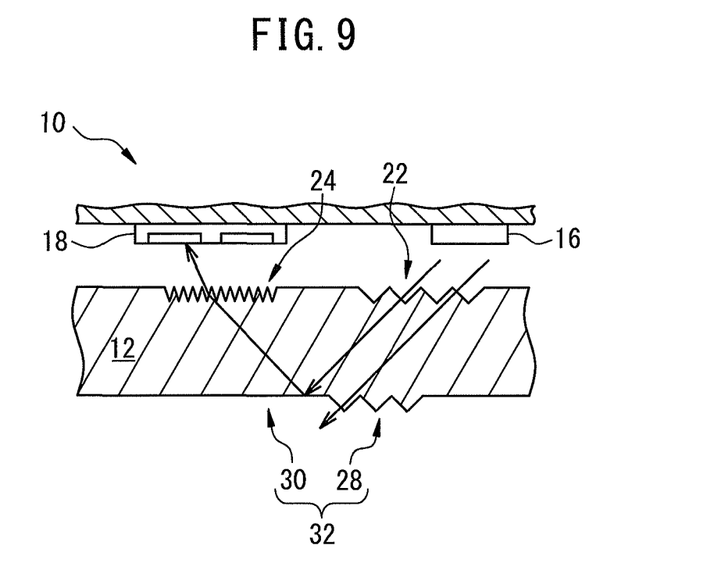
FIG. 9 shows an example wherein an incidence portion is formed from a plurality of V-shapes, an emission portion is formed from a plurality of V-shapes, and a light emitting unit is a directional light source.

FIG. 9 shows an example wherein incidence portion 22 is formed from a plurality of V-shapes, emission portion 24 is formed from a plurality of V-shapes, and light emitting unit 16 is a directional light source.

In the example of FIG. 9, similarly to the examples of FIGS. 3a, 4a and 7a, parallel light from light emitting unit 16 is directed to transmission portion 28 and total reflection portion 30, without being deflected by incidence portion 22. Then, light, which is reflected by total reflection portion 30, is deflected by emission portion 24, and is received by light receiving unit 18.

In other words, in the example of FIG. 9, the output angle of light from total reflection portion 30 to light receiving unit 18 via emission portion 24 can be appropriately adjusted by selecting the shape (for example, an angle of the inclined surface constituting the V-shape or the triangular shape) of emission portion 24.

Figure 10A:
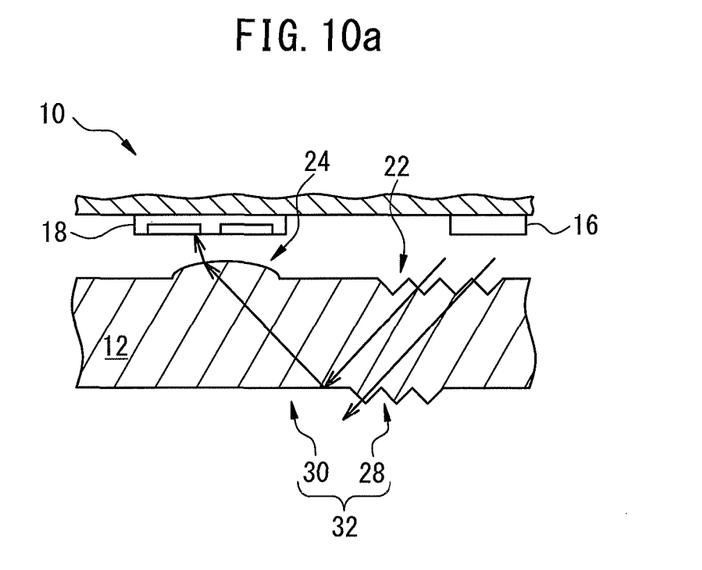
FIG. 10a shows an example wherein an incidence portion is formed from a plurality of V-shapes, an emission portion is formed from one curved surface, and a light emitting unit is a directional light source.
Figure 10B:
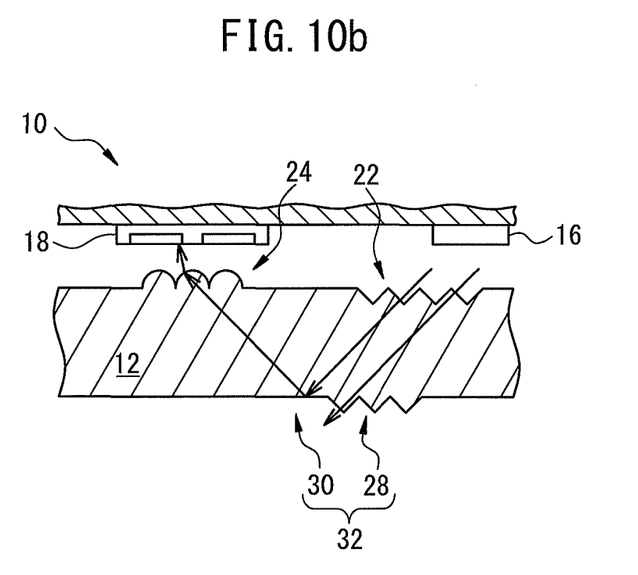
FIG. 10b shows an example wherein an incidence portion is formed from a plurality of V-shapes, an emission portion is formed from a plurality of curved surfaces, and a light emitting unit is a directional light source.

FIG. 10a shows an example wherein incidence portion 22 is formed from a plurality of V-shapes, and emission portion 24 is formed from one curved surface. On the other hand, FIG. 10b shows an example wherein incidence portion 22 is formed from a plurality of V-shapes, and emission portion 24 is formed from a plurality of curved surfaces. In the both examples, light emitting unit 16 is a directional light source.

In the examples of FIGS. 10a and 10b, similarly to the examples of FIGS. 3a, 4a, 7a and 9, parallel light from light emitting unit 16 is directed to transmission portion 28 and total reflection portion 30, without being deflected by incidence portion 22. Then, light, which is reflected by total reflection portion 30, is deflected by emission portion 24, and is received by light receiving unit 18. In other words, in any of the examples of FIGS. 10a and 10b, the output angle of light from total reflection portion 30 to light receiving unit 18 via emission portion 24 can be appropriately adjusted by selecting the shape of the curved surface of emission portion 24.

In any of the working examples as described above, transmission portion 28 formed on second major surface 26 of code plate 12 is illustrated as a plurality of triangular shapes. However, transmission portion 28 may have any shape as long as light from incidence portion 22 is transmitted toward second major surface 26 of code plate 12. For example, transmission portion 28 may have a V-shape, a triangular shape of a curved surface such as a shape provided to incidence portion 22 or emission portion 24 as described above.

In the reflective optical encoder according to the present invention, an inexpensive resin-made code plate is used, and the light emitting unit and the light receiving unit may be closely positioned to each other. Therefore, the present invention provides an inexpensive encoder which is compact in the axial direction thereof.

While the invention has been described with reference to specific embodiments chosen for the purpose of illustration, it should be apparent that numerous modifications could be made thereto, by one skilled in the art, without departing from the basic concept and scope of the invention.

The invention claimed is:

1. A reflective optical encoder comprising:
    a code plate which is formed by resin material and has a first major surface and a second major surface opposed to the first major surface;
    a light emitting unit positioned near the first major surface of the code plate; and
    a light receiving unit positioned near the first major surface of the code plate,
    wherein the first major surface of the code plate has:

1) an incidence portion with a concavo-convex shape allowing light transmitted from the light emitting unit to enter the code plate through the first major surface, and
2) an emission portion with a concavo-convex shape allowing the light to exit the code plate through the first major surface, and wherein the second major surface of the code plate has a code pattern section including:
1) a transmission portion formed from a V-shape, a triangular shape or a curved surface and configured to allow the light to exit the code plate through the second major surface, and
2) a total reflection portion formed from a flat surface and configured to totally reflect the light from the second major surface.

2. The reflective optical encoder as set forth in claim 1, wherein the concavo-convex shape of the incidence portion is a V-shape or a triangular shape.

3. The reflective optical encoder as set forth in claim 1, wherein the concavo-convex shape of the incidence portion is a curved shape.

4. The reflective optical encoder as set forth in claim 1, wherein the concavo-convex shape of the emission portion is a V-shape or a triangular shape.

5. The reflective optical encoder as set forth in claim 1, wherein the concavo-convex shape of the emission portion is a curved shape.

6. The reflective optical encoder as set forth in claim 1, wherein the incidence portion and the emission portion are positioned on the first major surface in a configuration that is offset with respect to the positions of the transmission portion and the total reflective portion on the second major surface.

* * * * *